United States Patent
Lim

(10) Patent No.: US 12,484,629 B2
(45) Date of Patent: Dec. 2, 2025

(54) AEROSOL-GENERATING DEVICE AND METHOD OF CONTROLLING THE SAME

(71) Applicant: KT&G CORPORATION, Daejeon (KR)

(72) Inventor: Hun Il Lim, Seoul (KR)

(73) Assignee: KT&G CORPORATION, Daejeon (KR)

( * ) Notice: Subject to any disclaimer, the term of this patent is extended or adjusted under 35 U.S.C. 154(b) by 931 days.

(21) Appl. No.: 17/281,112

(22) PCT Filed: Dec. 10, 2020

(86) PCT No.: PCT/KR2020/018106
§ 371 (c)(1),
(2) Date: Mar. 29, 2021

(87) PCT Pub. No.: WO2021/157840
PCT Pub. Date: Aug. 12, 2021

(65) Prior Publication Data
US 2022/0400769 A1    Dec. 22, 2022

(30) Foreign Application Priority Data
Feb. 7, 2020    (KR) .................. 10-2020-0015166

(51) Int. Cl.
*A24F 40/51*    (2020.01)
*A24F 40/10*    (2020.01)
(Continued)

(52) U.S. Cl.
CPC .............. *A24F 40/51* (2020.01); *A24F 40/10* (2020.01); *A24F 40/20* (2020.01); *A24F 40/30* (2020.01);
(Continued)

(58) Field of Classification Search
CPC .......... A24F 40/30; A24F 40/57; A24F 40/20; A24F 40/46; A24F 40/10; A24F 40/53; A24F 40/51
See application file for complete search history.

(56) References Cited

U.S. PATENT DOCUMENTS

| | | | |
|---|---|---|---|
| RE33,864 E | * | 3/1992 | Steiner .................... A61L 9/122 239/57 |
| 5,331,979 A | | 7/1994 | Henley |

(Continued)

FOREIGN PATENT DOCUMENTS

| | | |
|---|---|---|
| CA | 3 076 886 A1 | 5/2019 |
| CN | 107530511 A | 1/2018 |

(Continued)

OTHER PUBLICATIONS

International Search Report dated Mar. 31, 2021 from the International Searching Authority in International Application No. PCT/KR2020/018106.

(Continued)

*Primary Examiner* — Alex B Efta
(74) *Attorney, Agent, or Firm* — Sughrue Mion, PLLC

(57) ABSTRACT

An aerosol-generating device according to an aspect may include a first electrode located adjacent to a first accommodating portion that is configured to receive a first aerosol-generating material; a second electrode located adjacent to a second accommodating portion that is configured to receive a second aerosol-generating material; and a processor configured to adaptively set the polarity of at least one of the first electrode and the second electrode in response to a mode selected from among a plurality of modes.

11 Claims, 11 Drawing Sheets

(51) Int. Cl.
*A24F 40/20* (2020.01)
*A24F 40/30* (2020.01)
*A24F 40/46* (2020.01)
*A24F 40/53* (2020.01)
*A24F 40/57* (2020.01)
*G01D 5/24* (2006.01)

(52) U.S. Cl.
CPC .............. *A24F 40/46* (2020.01); *A24F 40/53* (2020.01); *A24F 40/57* (2020.01); *G01D 5/24* (2013.01)

(56) References Cited

U.S. PATENT DOCUMENTS

| | | | |
|---|---|---|---|
| 10,687,553 B2 | 6/2020 | Kaufman et al. | |
| 10,912,336 B2 | 2/2021 | Reevell | |
| 2014/0190503 A1* | 7/2014 | Li | A24F 40/60 131/329 |
| 2015/0150307 A1 | 6/2015 | Liu | |
| 2015/0189919 A1 | 7/2015 | Liu | |
| 2015/0196059 A1* | 7/2015 | Liu | A24F 40/30 392/394 |
| 2017/0071253 A1 | 3/2017 | Revell | |
| 2017/0231276 A1* | 8/2017 | Mironov | H05B 1/0244 131/328 |
| 2017/0231277 A1 | 8/2017 | Mironov et al. | |
| 2017/0231278 A1* | 8/2017 | Mironov | G01F 23/26 392/390 |
| 2018/0042308 A1 | 2/2018 | Takeuchi et al. | |
| 2018/0177238 A1 | 6/2018 | Bessant et al. | |
| 2018/0296779 A1 | 10/2018 | Takeuchi et al. | |
| 2019/0124982 A1 | 5/2019 | Atkins et al. | |
| 2019/0124992 A1 | 5/2019 | Nakano et al. | |
| 2019/0183177 A1 | 6/2019 | Hubbard et al. | |
| 2019/0246703 A1* | 8/2019 | Nakano | A61M 11/044 |
| 2021/0199432 A1 | 7/2021 | Bessant et al. | |
| 2022/0086959 A1 | 3/2022 | Mironov et al. | |
| 2022/0087321 A1 | 3/2022 | Jeong et al. | |

FOREIGN PATENT DOCUMENTS

| | | |
|---|---|---|
| CN | 108471812 A | 8/2018 |
| CN | 109310157 A | 2/2019 |
| CN | 110022705 A | 7/2019 |
| CN | 110198642 A | 9/2019 |
| EP | 3 413 732 A0 | 12/2018 |
| KR | 10-2016-0124853 A | 10/2016 |
| KR | 10-2018-0053649 A | 5/2018 |
| KR | 10-2018-0058709 A | 6/2018 |
| KR | 10-2018-0111845 A | 10/2018 |
| WO | WO-2016090426 A1 * | 6/2016 |
| WO | 2017/109868 A1 | 6/2017 |
| WO | 2017/137510 A1 | 8/2017 |
| WO | 2017/137512 A1 | 8/2017 |
| WO | 2018/114849 A1 | 6/2018 |
| WO | 2018/215142 A1 | 11/2018 |

OTHER PUBLICATIONS

Office Action dated Aug. 23, 2022 issued in Japanese Application No. 2021-540571.
Extended European Search Report dated Oct. 5, 2021 in European Application No. 20861985.8.
Office Action issued Feb. 21, 2024 in Chinese Application No. 202080006244.4.
Communication dated Nov. 22, 2024 in European Application No. 20 861 985.8.
Office Action issued Apr. 18, 2023, in Chinese Application No. 202080006244.4.

* cited by examiner

[Figure 1]
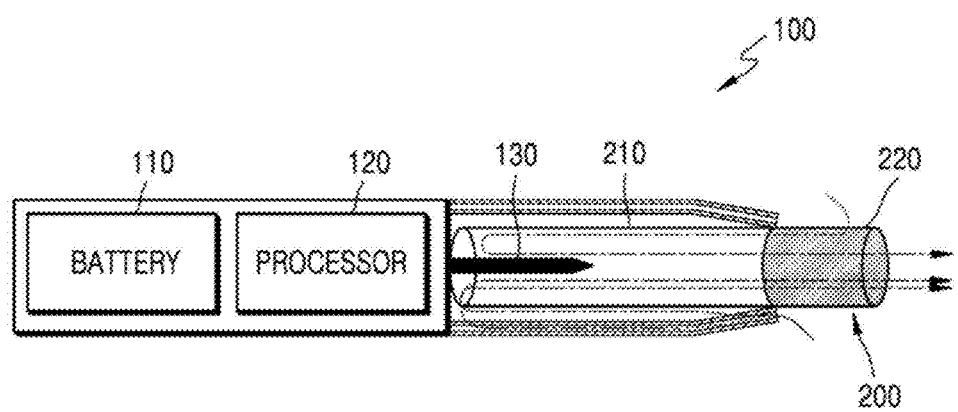
[Figure 2]
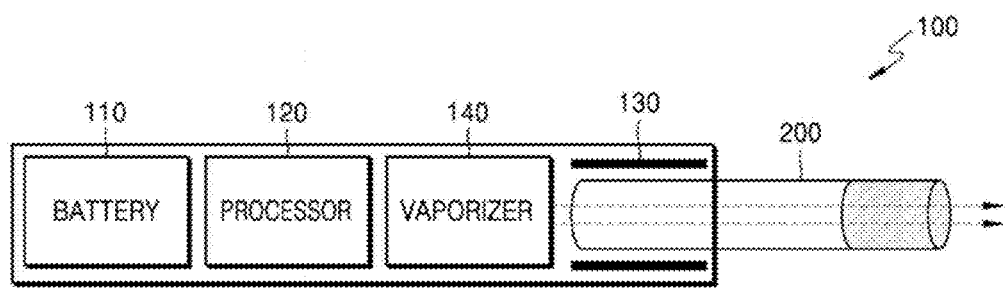

【Figure 3】
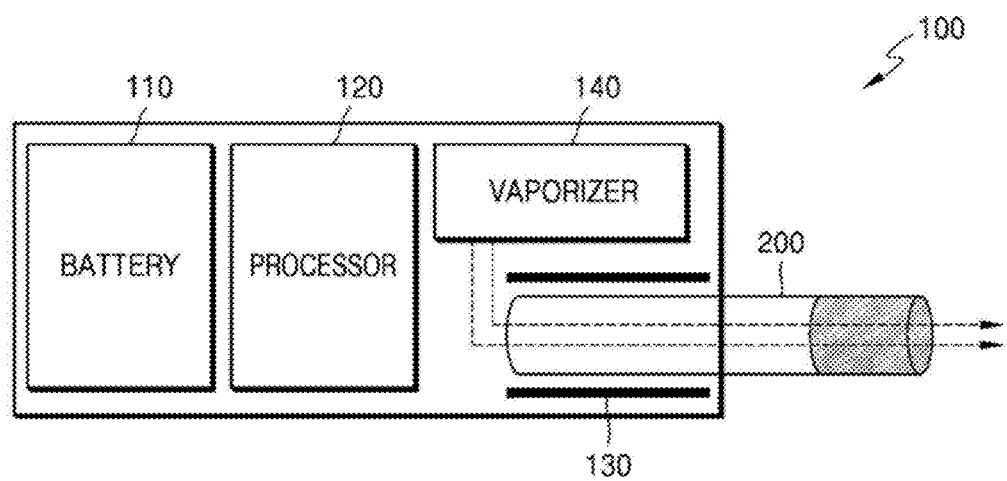
【Figure 4】
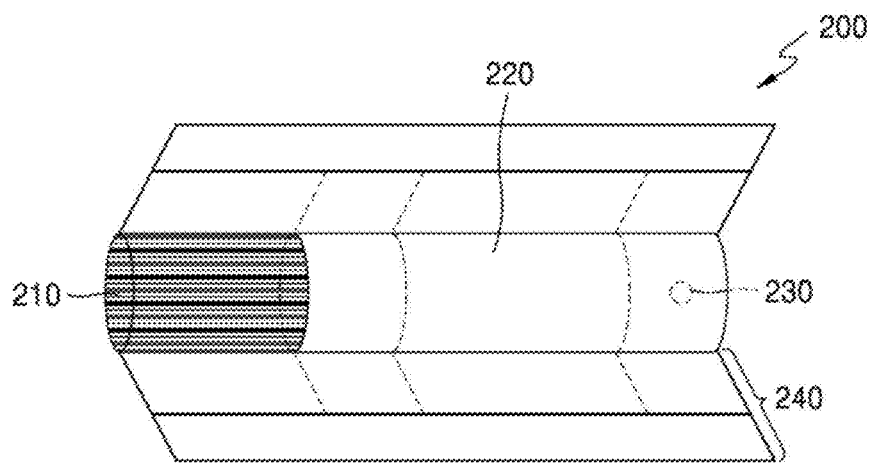

[Figure 5]
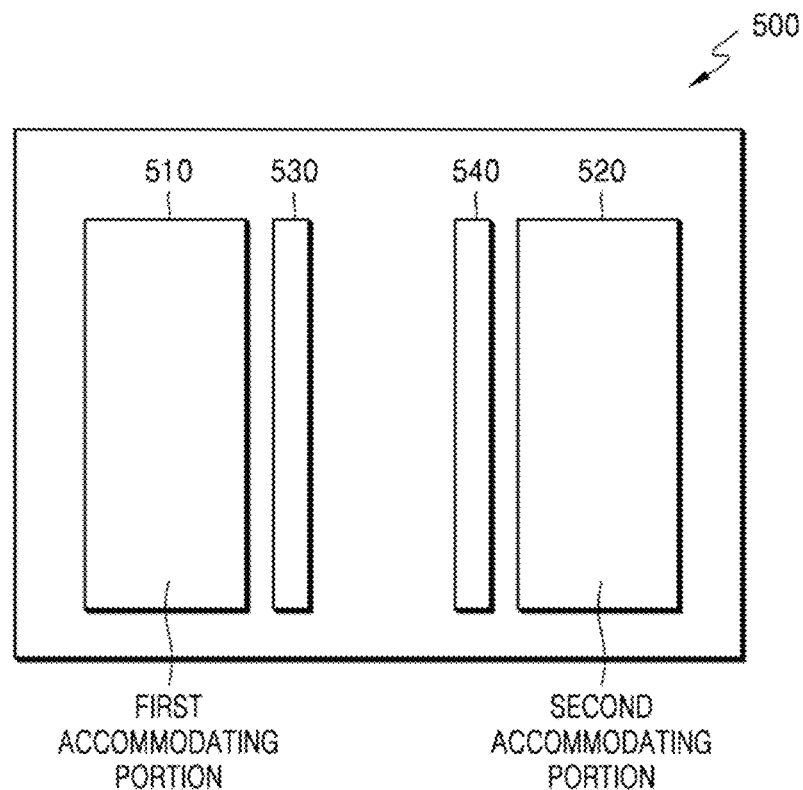
[Figure 6]
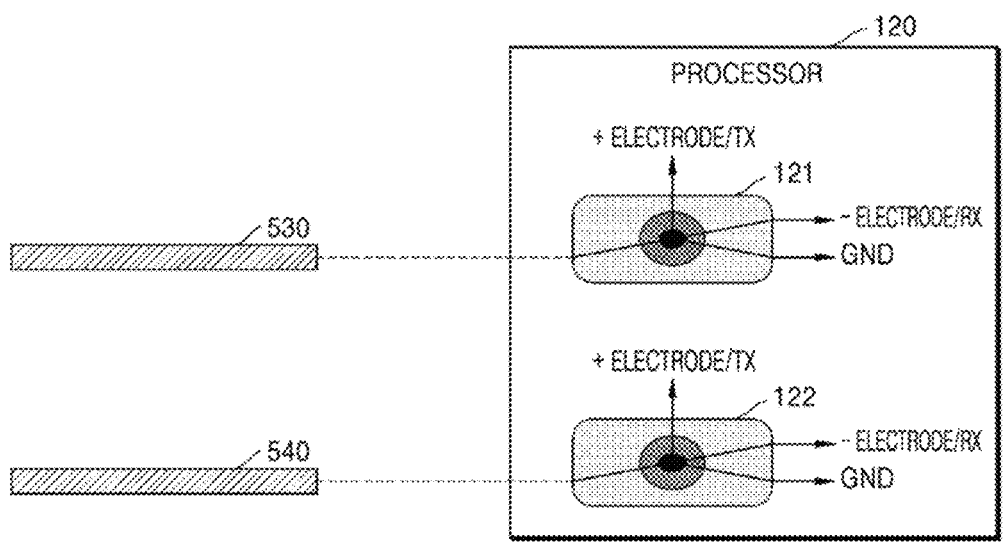

[Figure 7]
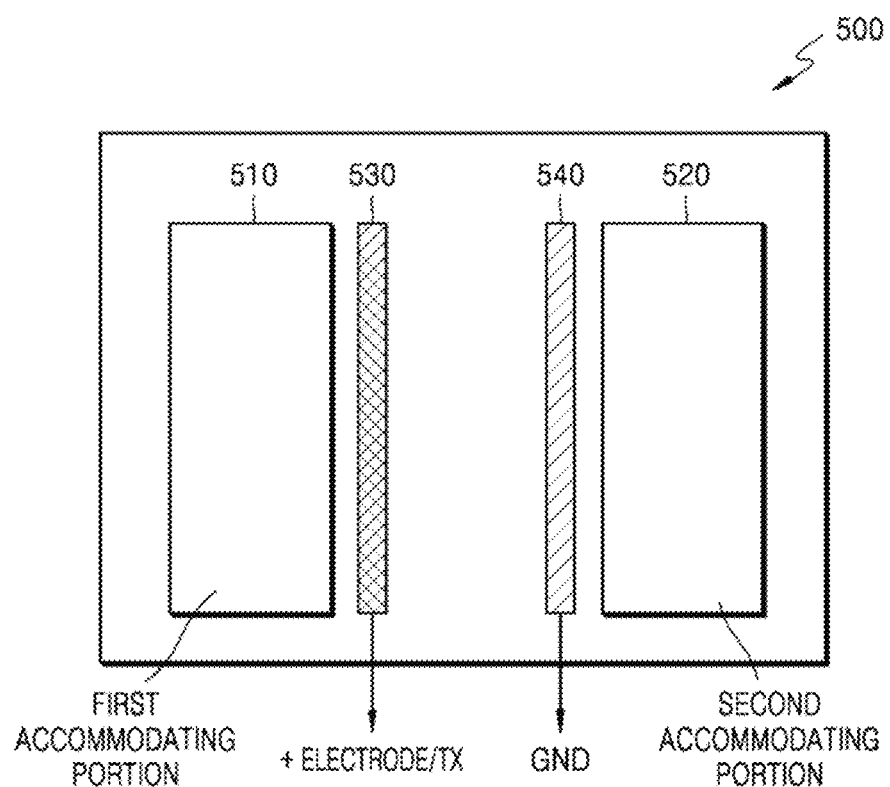

[Figure 8]
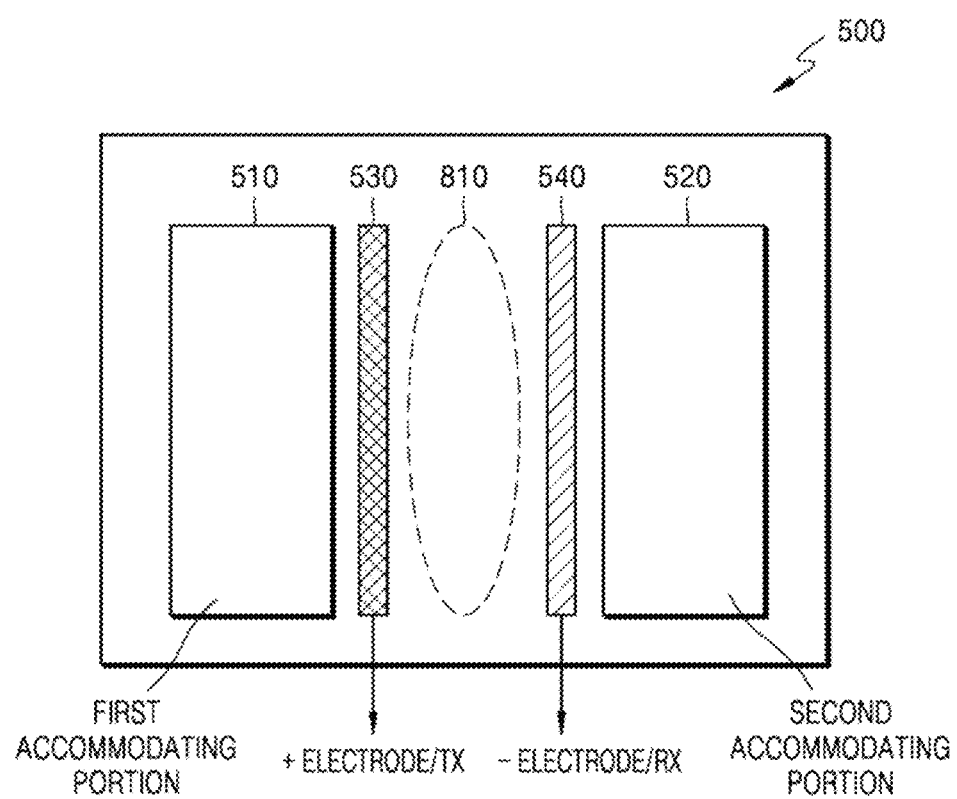

[Figure 9]
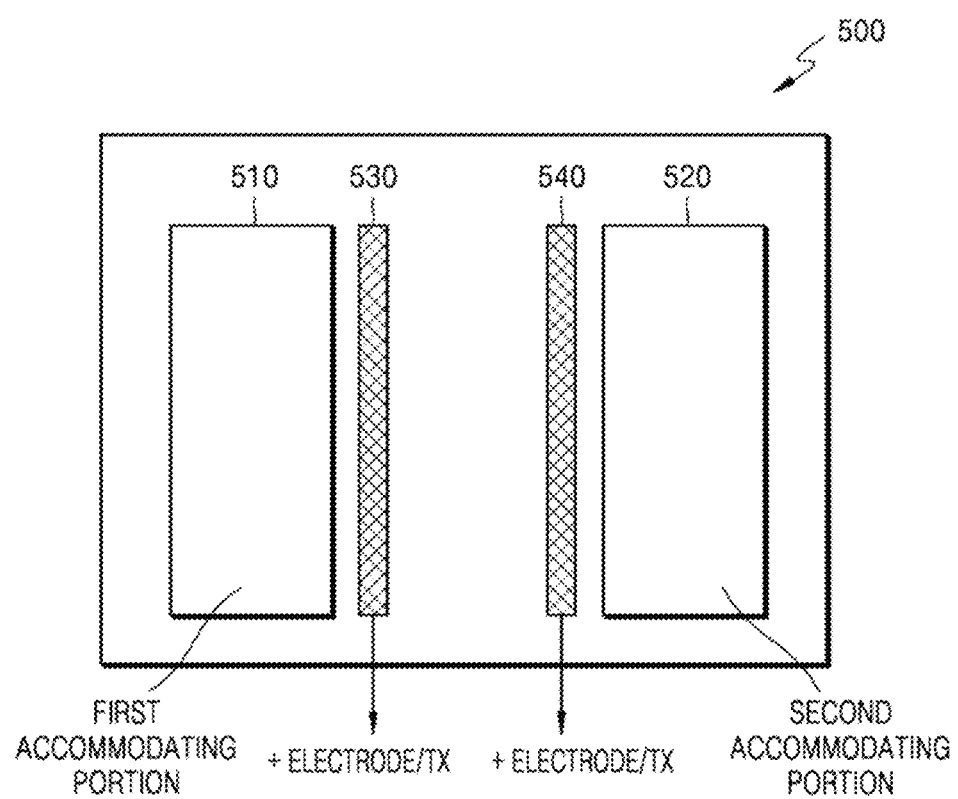

[Figure 10]
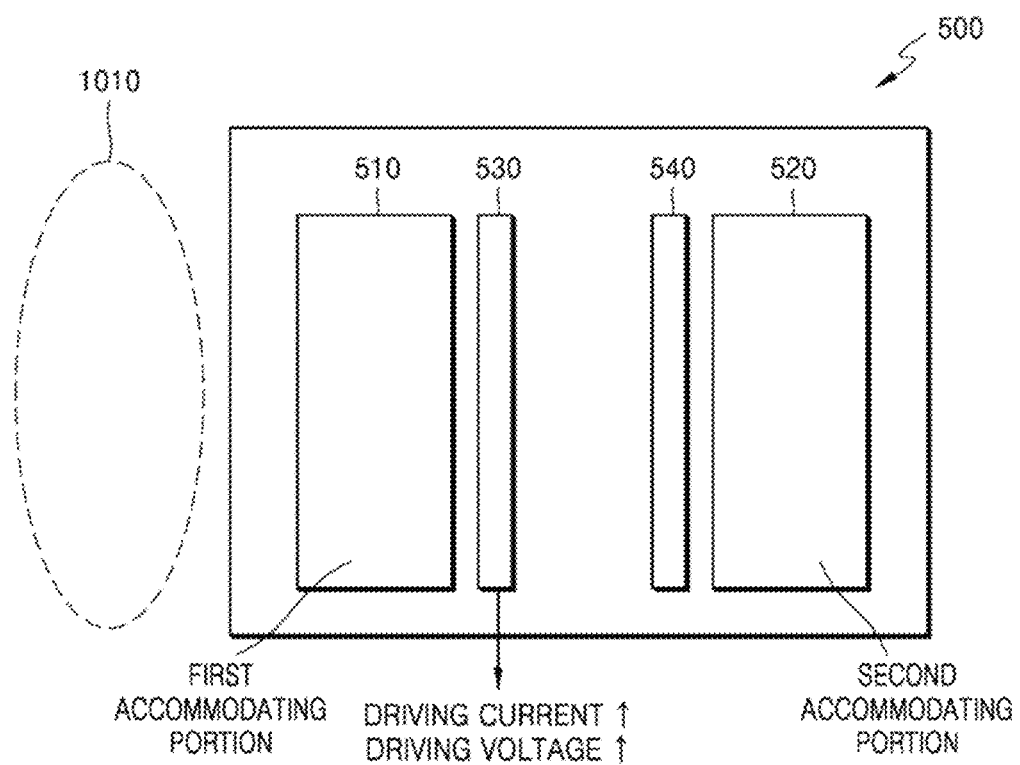

[Figure 11A]
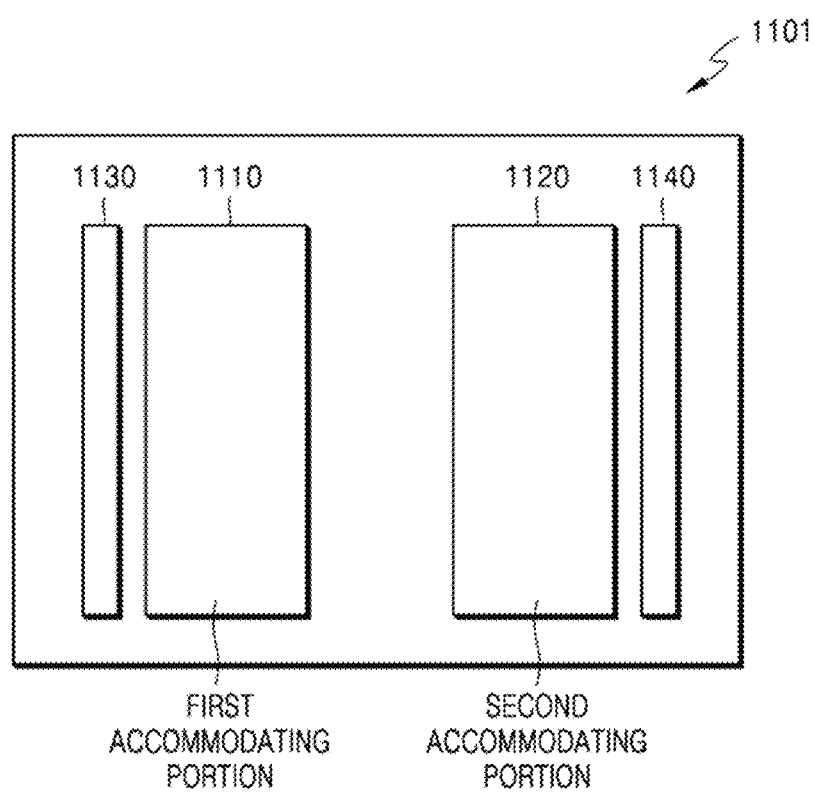

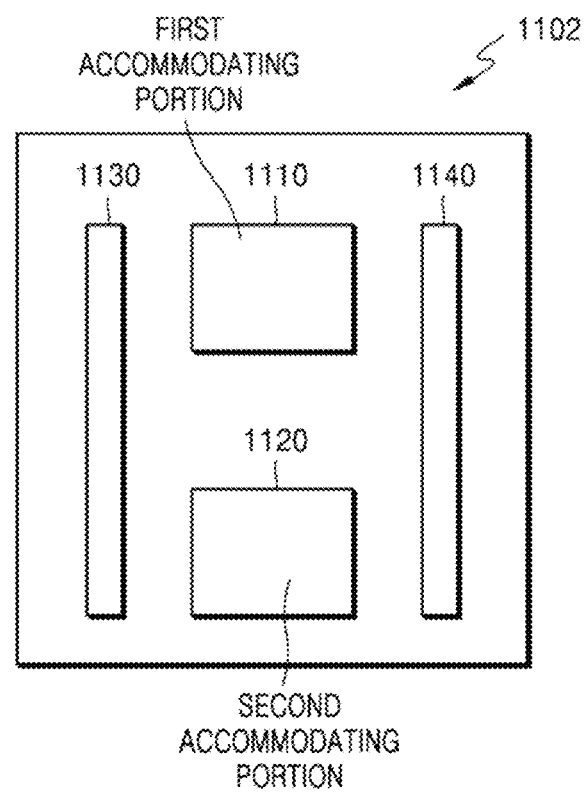
[Figure 11B]

[Figure 12]
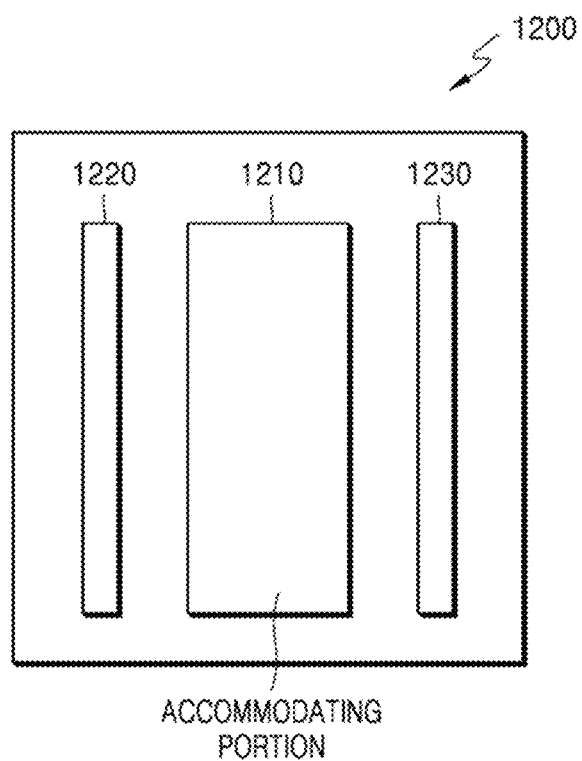

[Figure 13]
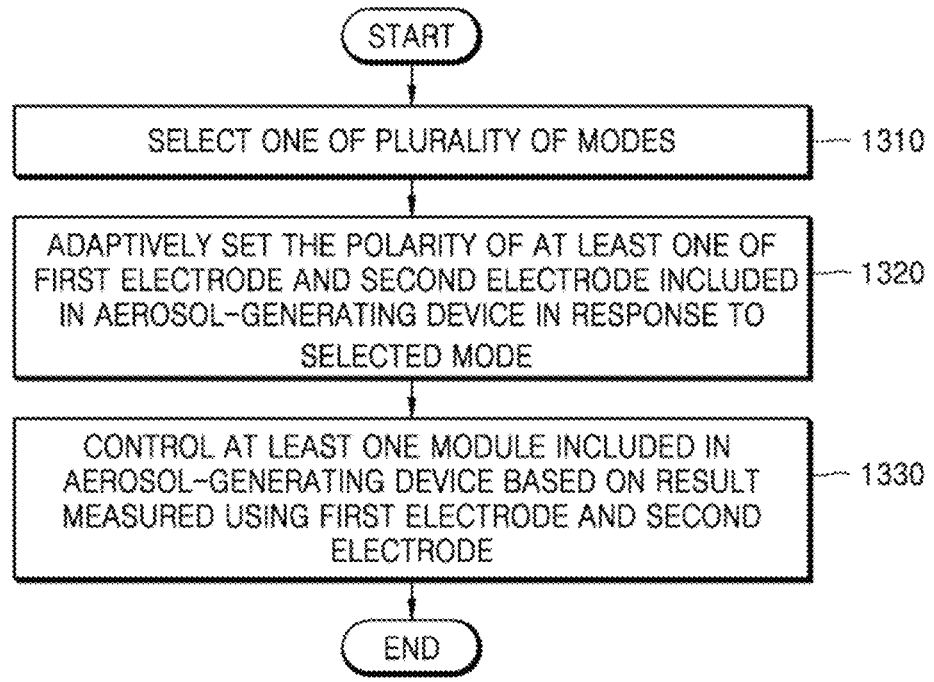

AEROSOL-GENERATING DEVICE AND METHOD OF CONTROLLING THE SAME

TECHNICAL FIELD

The disclosure relates to an aerosol-generating device and a method of controlling the same.

BACKGROUND ART

Recently, the demand for alternative methods to overcome the disadvantages of traditional cigarettes has increased. For example, there is growing demand for an aerosol generating device which generates aerosol by heating an aerosol generating material in cigarettes, rather than by combusting cigarettes. Accordingly, research on a heating-type aerosol generating device has been actively conducted.

DISCLOSURE

Technical Problem

One or more embodiments provide an aerosol-generating device and a method of controlling the aerosol-generating device, and more specifically, to solve a problem that occurs when a polarity of electrodes of a general sensor is not changed.

Technical Solution

An aerosol-generating device according to an aspect may include a first electrode located adjacent to a first accommodating portion in which a first aerosol-generating material is received; a second electrode located adjacent to a second accommodating portion in which a second aerosol-generating material is received; and a processor configured to adaptively set the polarity of at least one of the first electrode and the second electrode in response to a mode selected from among a plurality of modes.

Advantageous Effects

Since the polarities of the electrodes of the aerosol-generating device are adaptively set according to the selected mode, it is possible to sense or detect in various directions regardless of the position where the electrodes are arranged, thereby, improving the accuracy of the detection result.

In addition, the aerosol-generating device controls the operation of internal modules inside based on the above-described detection result, so that malfunction or failure of the aerosol-generating device can be prevented.

DESCRIPTION OF DRAWINGS

FIGS. 1 through 3 are diagrams showing examples in which a cigarette is inserted into an aerosol-generating device.

FIG. 4 illustrates an example of a cigarette.

FIG. 5 is a diagram illustrating an example of an arrangement of electrodes according to an embodiment.

FIG. 6 is a diagram illustrating polarities of a first electrode and a second electrode according to an embodiment.

FIG. 7 is a diagram illustrating an example in which a processor sets polarities of electrodes according to an embodiment.

FIG. 8 is a diagram illustrating another example in which a processor sets polarities of electrodes according to an embodiment.

FIG. 9 is a diagram illustrating another example in which a processor sets polarities of electrodes according to an embodiment.

FIG. 10 is a diagram illustrating another example in which a processor sets polarities of electrodes according to an embodiment.

FIGS. 11A and 11B are diagrams illustrating other examples of arrangements of electrodes according to an embodiment.

FIG. 12 is a diagram illustrating another example of an arrangement of electrodes according to an embodiment.

FIG. 13 is a flowchart illustrating an example of a method by which a processor controls an aerosol-generating device according to an embodiment.

BEST MODE

An aerosol generating device according to an aspect includes a first electrode located adjacent to a first accommodating portion that is configured to receive a first aerosol-generating material; a second electrode located adjacent to a second accommodating portion that is configured to receive a second aerosol-generating material; and a processor configured to adaptively set a polarity of at least one of the first electrode and the second electrode in response to a mode selected from among a plurality of modes.

The processor is configured to set the polarity of the at least one of the first electrode and the second electrode to positive based on the selected mode.

The selected mode includes a first mode of detecting a remaining amount of at least one of the first aerosol-generating material and the second aerosol-generating material.

The selected mode includes a second mode for detecting an insertion of at least one of the first aerosol-generating material and the second aerosol-generating material.

The selected mode includes a third mode for identifying at least one type of the first aerosol-generating material and the second aerosol-generating material.

The selected mode includes a fourth mode for sensing a material located between the first electrode and the second electrode.

The selected mode includes a fifth mode for detecting a noise from the at least one of the first electrode and the second electrode.

The processor is further configured to change a magnitude of a driving current or a magnitude of a driving voltage applied to the at least one of the first electrode and the second electrode.

The first accommodating portion is configured to receive a cigarette including the first aerosol-generating material, and the second accommodating portion is configured to receive a vaporizer including the second aerosol-generating material.

The first electrode and the second electrode include an electrode for measuring capacitance.

The first electrode and the second electrode are located between the first accommodating portion and the second accommodating portion.

The aerosol-generating device further includes a first heater configured to heat the first aerosol-generating material; and a second heater configured to heat the second aerosol-generating material, wherein the processor is further configured to control the first heater and the second heater based on the selected mode.

An aerosol-generating device according to another aspect includes a sensor including a first electrode and a second electrode; at least one space located adjacent to the sensor and accommodating an aerosol-generating material; and a processor configured to adaptively set a polarity of at least one of the first electrode and the second electrode in response to the selected mode among a plurality of modes.

A method of controlling an aerosol-generating device according to another aspect includes selecting one of a plurality of modes; adaptively setting a polarity of at least one of a first electrode and a second electrode included in the aerosol-generating device in response to the selected mode; and controlling at least one module included in the aerosol-generating device based on a result measured by using the first electrode and the second electrode.

A non-transitory computer-readable recording medium according to another aspect may include a computer-readable recording medium storing a program for executing the method described above on a computer.

MODE FOR INVENTION

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

With respect to the terms used to describe various embodiments, general terms which are currently and widely used are selected in consideration of functions of structural elements in the various embodiments of the present disclosure. However, meanings of the terms can be changed according to the intention of one of ordinary skilled in the art, judicial precedents, an emergence of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and in the context of the descriptions provided herein.

In addition, unless explicitly indicated otherwise, the word "comprise" and variations such as "comprises" or "comprising" will be understood to imply the inclusion of stated elements but not the exclusion of any other elements. In addition, the terms "-er", "-or", and "module" may refer to units for processing at least one function and operation and can be implemented by hardware components or software components and a combination thereof.

Hereinafter, the present disclosure will now be described in more detail with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the accompanying drawings.

FIGS. 1 through 3 are diagrams showing examples in which a cigarette is inserted into an aerosol-generating device.

Referring to FIG. 1, the aerosol generating device 100 may include a battery 110, a controller 120, and a heater 130. Referring to FIGS. 2 and 3, the aerosol generating device 100 may further include a vaporizer 140. Also, the cigarette 200 may be inserted into an inner space of the aerosol generating device 100.

FIGS. 1 through 3 illustrate components of the aerosol generating device 100, which are related to the present embodiment. Therefore, it will be understood by one of ordinary skill in the art related to the present embodiment that other components may be further included in the aerosol generating device 100, in addition to the components illustrated in FIGS. 1 through 3.

Also, FIGS. 2 and 3 illustrate that the aerosol generating device 100 includes the heater 130. However, according to necessity, the heater 130 may be omitted.

FIG. 1 illustrates that the battery 110, the controller 120, and the heater 130 are arranged in series. Also, FIG. 2 illustrates that the battery 110, the controller 120, the vaporizer 140, and the heater 130 are arranged in series. FIG. 3 illustrates that the vaporizer 140 and the heater 130 are arranged in parallel. However, the internal structure of the aerosol generating device 100 is not limited to the structures illustrated in FIGS. 1 through 3. In other words, according to the design of the aerosol generating device 100, the battery 110, the controller 120, the heater 130, and the vaporizer 140 may be arranged differently.

When the cigarette 200 is inserted into the aerosol generating device 100, the aerosol generating device 100 may operate the heater 130 and/or the vaporizer 140 to generate an aerosol from the cigarette 200 and/or the vaporizer 140. The aerosol generated by the heater 130 and/or the vaporizer 140 is delivered to a user by passing through the cigarette 200.

According to necessity, even when the cigarette 200 is not inserted into the aerosol generating device 100, the aerosol generating device 100 may heat the heater 130.

The battery 110 may supply power to operate the aerosol generating device 100. For example, the battery 110 may supply power to heat the heater 130 and/or the vaporizer 140, and may supply power for operating the controller 120. Also, the battery 110 may supply power for operations of a display, a sensor, a motor, etc. included in the aerosol generating device 100.

The controller 120 may generally control operations of the aerosol generating device 100. Specifically, the controller 120 may not only control the operations of the battery 110, the heater 130, and the vaporizer 140, but also control operations of other components included in the aerosol generating device 100. Also, the controller 120 may check the state of each of the components of the aerosol generating device 100 to determine whether or not the aerosol generating device 100 is in an operable state.

The controller 120 may include at least one processor. One or more processors can be implemented as an array of a plurality of logic gates or can be implemented as a combination of a microprocessor and a memory in which a program executable in the microprocessor is stored. It will be understood by one of ordinary skill in the art that the processor can be implemented in other forms of hardware.

The heater 130 may be heated by the power supplied from the battery 110. For example, when the cigarette 200 is inserted into the aerosol generating device 100, the heater 130 may be located outside the cigarette 200. Thus, the heated heater 130 may increase a temperature of an aerosol generating material in the cigarette 200.

The heater 130 may include an electro-resistive heater. For example, the heater 130 may include an electrically conductive track, and the heater 130 may be heated when currents flow through the electrically conductive track. However, the heater 130 is not limited to the example described above and may include all heaters which may be heated to a desired temperature. Here, the desired temperature may be pre-set in the aerosol generating device 100 or may be set as a temperature desired by a user.

As another example, the heater 130 may include an induction heater. Specifically, the heater 130 may include an electrically conductive coil for heating a cigarette in an induction heating method, and the cigarette may include a susceptor which may be heated by the induction heater.

For example, the heater 130 may include a tube-type heating element, a plate-type heating element, a needle-type heating element, or a rod-type heating element, and may heat the inside and/or the outside of the cigarette 200, according to the shape of the heating element.

Also, the aerosol generating device 100 may include a plurality of heaters 130. Here, the plurality of heaters 130 may be inserted into the cigarette 200 and/or may be arranged outside the cigarette 200. Also, some of the plurality of heaters 130 may be inserted into the cigarette 200 and the others may be arranged outside the cigarette 200. In addition, the shape of the heater 130 is not limited to the shapes illustrated in FIGS. 1 through 3 and may include various shapes.

The vaporizer 140 may generate an aerosol by heating a liquid composition and the generated aerosol may pass through the cigarette 200 to be delivered to a user. In other words, the aerosol generated via the vaporizer 140 may move along an air flow passage of the aerosol generating device 100 and the air flow passage may be configured such that the aerosol generated via the vaporizer 140 passes through the cigarette 200 to be delivered to the user.

For example, the vaporizer 140 may include a liquid storage, a liquid delivery element, and a heating element, but it is not limited thereto. For example, the liquid storage, the liquid delivery element, and the heating element may be included in the aerosol generating device 100 as independent modules.

The liquid storage may store a liquid composition. For example, the liquid composition may be a liquid including a tobacco-containing material having a volatile tobacco flavor component, or a liquid including a non-tobacco material. The liquid storage may be formed to be attached to/detached from the vaporizer 140 or may be formed integrally with the vaporizer 140.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be wound around the liquid delivery element. The heating element may be heated by a current supply and may transfer heat to the liquid composition in contact with the heating element, thereby heating the liquid composition. As a result, aerosol may be generated.

In addition, the vaporizer 140 may be referred to as a cartomizer or an atomizer, but it is not limited thereto.

The aerosol generating device 100 may further include components in addition to the battery 110, the controller 120, the heater 130, and the vaporizer 140. For example, the aerosol generating device 100 may include a display capable of outputting visual information and/or a motor for outputting haptic information. Also, the aerosol generating device 100 may include at least one sensor (e.g., a puff detecting sensor, a temperature detecting sensor, a cigarette insertion detecting sensor, etc.). Also, the aerosol generating device 100 may be formed such that, even when the cigarette 200 is inserted into the aerosol generating device 100, external air may be introduced or internal air may be discharged.

Although not illustrated in FIGS. 1 through 3, the aerosol generating device 100 and an additional cradle may form together a system. For example, the cradle may be used to charge the battery 110 of the aerosol generating device 100. Alternatively, the heater 130 may be heated when the cradle and the aerosol generating device 100 are coupled to each other.

The cigarette 200 may be similar as a general combustive cigarette. For example, the cigarette 200 may be divided into a first portion including an aerosol generating material and a second portion including a filter, etc. Alternatively, the second portion of the cigarette 200 may also include an aerosol generating material. For example, the aerosol generating material may include granules or capsules that may be inserted into the second portion.

The entire first portion may be inserted into the aerosol generating device 100, and the second portion may be exposed to the outside. Alternatively, only a portion of the first portion may be inserted into the aerosol generating device 100, or the entire first portion and a portion of the second portion may be inserted into the aerosol generating device 100. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 100. For example, the opening and closing and/or a size of the air passage formed in the aerosol generating device 100 may be adjusted by the user. Accordingly, the amount of smoke and a smoking impression may be adjusted by the user. As another example, the external air may flow into the cigarette 200 through at least one hole formed in a surface of the cigarette 200.

Hereinafter, an example of the cigarette 200 will be described with reference to FIG. 4.

FIG. 4 illustrates an example of a cigarette.

Referring to FIG. 4, the cigarette 200 may include a tobacco rod 210 and a filter rod 220. The first portion described above with reference to FIGS. 1 through 3 may include the tobacco rod 210, and the second portion may include the filter rod 220.

FIG. 4 illustrates that the filter rod 220 includes a single segment. However, the filter rod 220 is not limited thereto. In other words, the filter rod 220 may include a plurality of segments. For example, the filter rod 220 may include a first segment configured to cool an aerosol and a second segment configured to filter a certain component included in the aerosol. Also, according to necessity, the filter rod 220 may further include at least one segment configured to perform other functions.

The cigarette 200 may be packaged via at least one wrapper 240. The wrapper 240 may have at least one hole through which external air may be introduced or internal air may be discharged. For example, the cigarette 200 may be packaged via one wrapper 240. As another example, the cigarette 200 may be double-packaged via at least two wrappers 240. For example, the tobacco rod 210 may be packaged via a first wrapper, and the filter rod 220 may be packaged via a second wrapper. Also, the tobacco rod 210 and the filter rod 220, which are respectively packaged via the first and second wrappers, may be coupled to each other, and the entire cigarette 200 may be packaged via a third wrapper. When each of the tobacco rod 210 and the filter rod 220 includes a plurality of segments, each segment may be packaged via a separate wrapper. Also, the entire cigarette 200 including the plurality of segments, which are respectively packaged via the separate wrappers and which are coupled to each other, may be re-packaged via another wrapper.

The tobacco rod 210 may include an aerosol generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which may be injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet. Also, the tobacco rod 210 may be surrounded by a heat conductive material. For example, the heat-conducting material may be, but is not limited to, a metal foil such as aluminum foil. For example, the heat conductive material surrounding the tobacco rod 210 may uniformly distribute heat to the tobacco rod 210, and thus, the heat conductivity applied to the tobacco rod may be increased and the taste of the tobacco may be improved. Also, the heat conductive material surrounding the tobacco rod 210 may function as a susceptor heated by the induction heater. Here, although not illustrated in the drawings, the tobacco rod 210 may further include an additional susceptor, in addition to the heat conductive material surrounding the tobacco rod 210.

The filter rod 220 may include a cellulose acetate filter. Shapes of the filter rod 220 are not limited. For example, the filter rod 220 may include a cylinder-type rod or a tube-type rod having a hollow inside. Also, the filter rod 220 may include a recess-type rod. When the filter rod 220 includes a plurality of segments, at least one of the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. Here, the capsule 230 may generate a flavor or an aerosol. For example, the capsule 230 may have a configuration in which a liquid containing a flavoring material is wrapped with a film. The capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described examples and is not limited as long as the cooling segment cools the aerosol.

Although not illustrated in FIG. 4, the cigarette 200 according to an embodiment may further include a front-end filter. The front end plug may be located on one side of the tobacco rod 210 which is opposite to the filter rod 220. The front-end filter may prevent the tobacco rod 210 from being detached outwardly and prevent a liquefied aerosol from flowing into the aerosol generating device 100 (FIGS. 1 through 3) from the tobacco rod 210, during smoking.

As described above with reference to FIGS. 1 to 3, the cigarette 200 and the vaporizer 140 may be detached from or attached to the aerosol-generating device 100. In addition, as the heater 130 and the vaporizer 140 operate, the amount of aerosol-generating material included in the cigarette 200 and the vaporizer 140 is reduced. Therefore, in order to ensure proper operation of the aerosol-generating device 100, it is important to check whether the cigarette 200 or the vaporizer 140 is inserted into the aerosol-generating device 100 and the amount of the aerosol-generating material included in the cigarette 200 or the vaporizer 140. In addition, in order to ensure proper operation of the aerosol-generating device 100, it is also important to detect a problem inside the aerosol-generating device 100 (e.g., leakage of an aerosol-generating material) and a problem outside the aerosol-generating device 100 (e.g., approaching a dangerous object).

According to an embodiment, the aerosol-generating device 100 includes a plurality of electrodes, and the above-described check or detection method may be performed through the electrodes. In particular, the processor 120 of the aerosol-generating device 100 may change the polarity of the electrodes according to a situation. The processor 120 may adaptively set the polarities of the plurality of electrodes in response to a selected mode from among the plurality of modes. The processor 120 may selectively set the polarities of the plurality of electrodes in response to a selected mode from among the plurality of modes. Here, the plurality of modes mean operations that the aerosol-generating device 100 intends to perform through electrodes.

For example, the plurality of modes may include a mode for detecting the remaining amount of the aerosol-generating material received by the aerosol-generating device 100. In addition, the plurality of modes may include a mode that detects whether an aerosol-generating material (or an object containing an aerosol-generating material) is inserted into the aerosol-generating device 100. In addition, the plurality of modes may include a mode for identifying the type of aerosol-generating material received by the aerosol-generating device 100. In addition, the plurality of modes may include a mode for sensing a material positioned between the plurality of electrodes. Further, the plurality of modes may include a mode for detecting noise due to at least one of the electrodes.

The electrodes of the aerosol-generating device 100 may be electrodes for measuring capacitance. In other words, the electrodes may constitute a capacitance sensor. In the case of a typical capacitance sensor, since the polarities of the electrodes are not changed, there is a limit in the detection direction and the accuracy of detection, depending on the position where the electrodes are located. However, since the polarity of the electrodes of the aerosol-generating device 100 is adaptively set according to the selected mode, it is possible to sense or detect in various directions regardless of where the electrodes are located, and the accuracy of the detection result is improved.

Hereinafter, an example of arrangement of electrodes of the aerosol-generating device 100 and an example of operating the aerosol-generating device 100 will be described with reference to FIGS. 5 to 13.

FIG. 5 is a diagram illustrating an example of an arrangement of electrodes according to an embodiment.

FIG. 5 shows a portion 500 of an aerosol-generating device 100. The portion 500 includes a first accommodating portion 510, a second accommodating portion 520, a first electrode 530 and a second electrode 540.

Each of the first accommodating portion 510 and the second accommodating portion 520 is a space in which an aerosol-generating material is accommodated. That is, the aerosol-generating material accommodated in the first accommodating portion 510 may be a solid at room temperature, and the aerosol-generating material accommodated in the second accommodating portion 520 may be liquid at room temperature. For example, the cigarette 200 may be accommodated in the first accommodating portion 510, and the vaporizer 140 may be accommodated in the second accommodating portion 520.

As described above with reference to FIGS. 1 to 4, each of the cigarette 200 and the vaporizer 140 includes the aerosol-generating material. Here, the cigarette 200 includes an aerosol-generating material that is a solid at room temperature, and the vaporizer 140 includes an aerosol-generating material that is liquid at room temperature. Accordingly, each of the first accommodation portion 510 and the second accommodation portion 520 is located where the aerosol-generating material is accommodated, and it may be understood that the state of the aerosol-generating material in the first accommodating portion 510 and the state of the aerosol-generating material in the second accommodating portion 520 may be different from each other (i.e., solid or liquid).

In addition, when there are a plurality of spaces (spaces in which the aerosol-generating material is accommodated) included in the portion 500, the state of the aerosol-generating material accommodated in each of the spaces may be the same.

The first electrode 530 may be located adjacent to the first accommodating portion 510, and the second electrode 540 may be located adjacent to the second accommodating portion 520. Here, the term "located adjacent" may refer to a relative distance. For example, when the first electrode 530 is located adjacent to the first accommodating portion 510, it may mean that the distance from the first electrode 530 to the first accommodating portion 510 is shorter than the distance from the first electrode 530 to the second accommodating portion 520. Therefore, when the first electrode 530 is located relatively closer to the first accommodating portion 510 than the second accommodating portion 520, the position of the first electrode 530 may be located anywhere in the portion 500 being relatively closer to the first accommodating portion 510. Similarly, when the second electrode 540 is located adjacent to the second accommodating portion 520, the position of the second electrode 540 may be anywhere in the portion 500 being closer to the second accommodating portion 520.

For example, the first electrode 530 and the second electrode 540 may be electrodes for measuring capacitance. In other words, the first electrode 530 and the second electrode 540 may be electrodes constituting a capacitance sensor. A driving current or driving voltage is applied to the first electrode 530 and/or the second electrode 540, and the processor 120 measures a change in capacitance based on a signal received through the first electrode 530 and/or the second electrode 540. In addition, the processor 120 derives various results based on the detected change in capacitance. Here, the derived result depends on the mode in which the processor 120 operates. In other words, the processor 120 may derive a specific result from the change in value of the capacitance according to the selected mode from among the plurality of modes.

The processor 120 according to an embodiment adaptively sets the polarities of the first electrode 530 and/or the second electrode 540 according to a selected mode from among the plurality of modes. In other words, the polarities of the first electrode 530 and the second electrode 540 are not fixed, and may be changed under the control of the processor 120.

Hereinafter, referring to FIG. 6, examples of polarities of the first electrode 530 and the second electrode 540 will be described.

FIG. 6 is a diagram illustrating polarities of a first electrode and a second electrode according to an embodiment.

FIG. 6 illustrates an example in which the processor 120 is connected to the first electrode 530 and the second electrode 540. The processor 120 may include a module 121 for changing the polarity of the first electrode 530 and a module 122 for changing the polarity of the second electrode 540. The modules 121 and 122 illustrated in FIG. 6 are illustrated for convenience of description. Accordingly, when the processor 120 may change the polarities of the first electrode 530 and the second electrode 540, there is no limitation on the structure or arrangement design of the processor 120.

The processor 120 may set the polarities of the first electrode 530 and the second electrode 540 to one of positive, negative, and ground (GND). Here, it is obvious to a person skilled in the art that a positive electrode may be expressed as a transmitting (Tx) electrode and a negative electrode may be expressed as a receiving (Rx) electrode.

The processor 120 may set the polarity of at least one of the first electrode 530 and the second electrode 540 to be positive. Specifically, the processor 120 may set the polarity of the electrode related to the selected mode from among the plurality of modes as positive. The processor 120 may apply a driving current or a driving voltage to set an electrode (i.e., a positive electrode) as positive, and derive a detection result based on a value of a capacitance that is changed according to a detection target.

Hereinafter, referring to FIGS. 7 to 10, examples in which the processor 120 adaptively sets the polarities of the electrodes 530 and 540 according to a specific mode will be described. The portion 500 illustrated in FIGS. 7 to 10 is a portion of the aerosol-generating device 100 as described above with reference to FIG. 5.

FIG. 7 is a diagram illustrating an example in which a processor sets polarities of electrodes according to an embodiment.

As an example, the processor 120 may set the polarities of the electrodes 530 and 540 to detect the remaining amount of the aerosol-generating material. In other words, the selected mode among the plurality of modes is a mode for detecting the remaining amount of at least one of the first aerosol-generating material and the second aerosol-generating material, and the processor 120 may set the polarities of the electrodes 530 and 540 according to the selected mode.

For example, the processor 120 may set the polarity of the first electrode 530 to be positive in order to detect the remaining amount of the first aerosol-generating material included in the first accommodating portion 510. A signal corresponding to the magnetic field may be transmitted from the first electrode 530, which may vary depending on the remaining amount of the first aerosol-generating material. That is, since the first aerosol-generating material may be a dielectric material with a unique permittivity, a signal transmitted from the first electrode 530 may be changed according to the remaining amount of the first aerosol-generating material.

The processor 120 may calculate a change in the capacitance value based on a change in the signal transmitted from the first electrode 530. Accordingly, the processor 120 may detect the remaining amount of the first aerosol-generating material is based on the change in the capacitance value.

In this case, the processor 120 may set the polarity of the second electrode 540 to be GND. As the polarity of the second electrode 540 is set to GND, the signal transmitted from the first electrode 530 may be prevented from being affected by the second aerosol-generating material of the second accommodating portion 520. That is, since the second aerosol-generating material may also be a dielectric material with a unique permittivity, the second aerosol-generating material may also contribute to a change in a signal transmitted from the first electrode 530.

However, as the processor 120 sets the polarity of the second electrode 540 to GND, a signal transmitted from the first electrode 530 may be prevented from being affected by the second aerosol-generating material. Accordingly, the processor 120 may accurately detect the remaining amount of the first aerosol-generating material.

As another example, the processor 120 may set the polarities of the electrodes 530 and 540 to detect that the aerosol-generating material is inserted into the aerosol-generating device 100. In other words, a mode selected from among the plurality of modes is a mode for detecting insertion of at least one of the first aerosol-generating material and the second aerosol-generating material, and the processor 120 may set the polarities of the electrodes 530 and 540 according to the selected mode.

For example, the processor 120 may set the polarity of the first electrode 530 to positive in order to detect that the first aerosol-generating material (or an object containing the first aerosol-generating material) is inserted into the first accommodating portion 510. As described above, the aerosol-generating material may be a dielectric material. Accordingly, as the first aerosol-generating material approaches the aerosol-generating device 100, a signal transmitted from the first electrode 530 may be changed. Accordingly, the processor 120 may detect that the first aerosol-generating material (or an object including the first aerosol-generating material) is inserted into the first accommodating portion 510 based on a change in the signal transmitted from the first electrode 530.

In this case, the processor 120 may prevent the second aerosol-generating material from affecting the signal transmitted from the first electrode 530 by setting the polarity of the second electrode 540 to GND. Accordingly, the processor 120 may accurately detect whether the first aerosol-generating material is inserted.

As another example, the processor 120 may set the polarities of the electrodes 530 and 540 to identify the type of the aerosol-generating material. In other words, a mode selected from among the plurality of modes is a mode for identifying at least one type of the first aerosol-generating material and the second aerosol-generating material, and the processor 120 may set the polarities of the electrodes 530 and 540 according to the selected mode.

As illustrated in FIG. 7, when the polarity of the first electrode 530 is set to positive and the polarity of the second electrode 540 is set to GND, the processor 120 may identify the type of the first aerosol-generating material accommodated in the first accommodating portion 510. The first aerosol-generating material may be a composition including at least one component. Accordingly, the first aerosol-generating material represents a unique permittivity according to the type and a composition ratio of each of the components. Accordingly, the processor 120 may identify the type of the first aerosol-generating material (e.g., type and composition ratios of components) by checking a change in the signal transmitted from the first electrode 530. That is, the processor 120 may distinguish whether the first aerosol-generating material is genuine or counterfeit based on the signal transmitted from the first electrode 530.

As described above with reference to FIG. 7, the processor 120 may set the polarity of the first electrode 530 to positive and the polarity of the second electrode 540 to GND. However, according to the same principle as described above, it may be understood by those of ordinary skill in the art that the processor 120 may set the polarity of the first electrode 530 to GND and the polarity of the second electrode 540 to positive.

FIG. 8 is a diagram illustrating another example in which a processor sets polarities of electrodes according to an embodiment.

The processor 120 may set the polarities of the electrodes 530 and 540 in order to detect a material 810 positioned between the electrodes 530 and 540. In other words, the mode selected from among the plurality of modes is a mode for detecting the material 810 located between the electrodes 530 and 540, and the processor 120 may set the polarities of the electrodes 530 and 540 according to the selected mode.

For example, the processor 120 may set the polarity of the first electrode 530 to positive and the polarity of the second electrode 540 to negative. In this case, since the material 810 serves as a dielectric material, the material 810 may operate as a capacitor together with the first electrode 530 and the second electrode 540. Thus, the processor 120 may calculate the value of capacitance corresponding to the material 810 through the first electrode 530 and the second electrode 540 and identify the type of the material 810.

Through the above-described operation, the processor 120 may check whether the first aerosol-generating material and/or the second aerosol-generating material have leaked. That is, when the material 810 corresponds to the aerosol-generating material, the processor 120 may recognize that the material 810 has leaked from the first accommodating portion 510 or the second accommodating portion 520. Accordingly, the processor 120 may prevent a malfunction or malfunction due to contamination of the aerosol-generating device 100.

On the other hand, according to the same principle as described above with reference to FIG. 8, it may be understood by those of ordinary skill in the art that the processor 120 may set the polarity of the first electrode 530 to negative and the polarity of the second electrode 540 to positive.

FIG. 9 is a diagram illustrating another example in which a processor sets polarities of electrodes according to an embodiment.

As an example, the processor 120 may set the polarities of the electrodes 530 and 540 to simultaneously sense the first aerosol-generating material and the second aerosol-generating material. In other words, the mode selected from among the plurality of modes is the mode that identifies the remaining amount, insertion or type of each of the first aerosol-generating material and the second aerosol-generating material, and the processor 120 may set the polarities of the electrodes 530 and 540 according to the selected mode.

For example, the processor 120 may set both the polarities of the first electrode 530 and the second electrode 540 to be positive. In this case, the examples described above with reference to FIG. 7 may be equally applied to the example shown in FIG. 9. Specifically, FIG. 7 is an example in which the processor 120 identifies the remaining amount, insertion, or type of the first aerosol-generating material or the second aerosol-generating material. On the other hand, in the case of FIG. 9, as both the polarity of the first electrode 530 and the polarity of the second electrode 540 are set to positive, the processor 120 may simultaneously identify the remaining amount, insertion, or type of the first aerosol-generating material and the second aerosol-generating material.

As another example, the processor 120 may set the polarities of the electrodes 530 and 540 to detect noise due to the first electrode 530 and/or the second electrode 540. In other words, a mode selected from among the plurality of modes is a mode for detecting noise due to at least one of the first electrode 530 and the second electrode 540, and the processor 120 may set the polarities of the electrodes 530 and 540 according to the selected mode.

For example, the processor 120 may set both the polarities of the first electrode 530 and the second electrode 540 to be positive. This means that signals are transmitted from both the first electrode 530 and the second electrode 540. In this case, the processor 120 may recognize a phase difference (or a capacitance causing a phase difference) between the signal transmitted from the first electrode 530 and the signal transmitted from the second electrode 540 as noise. Accordingly, the processor 120 may remove the detected noise from the transmitted signals, and the sensitivity of detection (or measurement) through the first electrode 530 and the second electrode 540 may be improved.

FIG. 10 is a diagram illustrating another example in which the processor sets polarities of electrodes according to an embodiment.

The processor 120 may change the magnitude of the driving current or the magnitude of the driving voltage, applied to at least one of the first electrode 530 or the second electrode 540. For example, as the magnitude of the driving current or the magnitude of the driving voltage applied to the first electrode 530 increases, the sensitivity of detection (or measurement) through the first electrode 530 may be improved. Accordingly, the processor 120 may also detect an object approaching from the outside 1010 of the aerosol-generating device 100. Thus, the processor 120 may prevent a failure or malfunction of the aerosol-generating device 100 due to a dangerous object (e.g., a magnet, etc.) approaching from the outside 1010.

In FIGS. 5 to 10, the first electrode 530 and the second electrode 540 are shown to be located between the first accommodating portion 510 and the second accommodating portion 520. However, the arrangement of the first electrode 530, the second electrode 540, the first accommodating portion 510, and the second accommodating portion 520 is not limited to those illustrated in FIGS. 5 to 10. In addition, in FIGS. 5 to 10, the aerosol-generating device 100 is shown to include a plurality of accommodating portions 510 and 520, but a single accommodating portion may be included.

FIGS. 11A and 11B are diagrams illustrating other examples of arrangements of electrodes according to an exemplary embodiment.

FIGS. 11A and 11B illustrate portions 1101 and 1102 of the aerosol-generating device 100 including the accommodating portions 1110 and 1120 and electrodes 1130 and 1140. Here, the functions of the accommodating portions 1110 and 1120 and the electrodes 1130 and 1140 are as described above with reference to FIGS. 5 to 10. Accordingly, hereinafter, descriptions of the functions of the accommodating portions 1110 and 1120 and the electrodes 1130 and 1140 are omitted.

When comparing the example illustrated in FIG. 11A with the example illustrated in FIG. 5, there is a difference in that the electrodes 1130 and 1140 of FIG. 11A are located outside the accommodating portions 1110 and 1120, but the electrodes 530 and 540 of FIG. 5 are located between the accommodating portions 510 and 520. However, similar to the example shown in FIG. 5, in FIG. 11, the first electrode 1130 is located adjacent to the first accommodating portion 1110 and the second electrode 1140 is located adjacent to the second accommodating portion 1120.

Comparing the example shown in FIG. 11A with the example shown in FIG. 11B, there is a difference in that the accommodating portions 1110 and 1120 of FIG. 11B are arranged in a row direction, but the accommodating portions 1110 and 1120 of FIG. 11A are arranged in a column direction.

However, the arrangement of the accommodating portions 1110 and 1120 and the electrodes 1130 and 1140 is not limited to those shown in FIGS. 11A and 11B, and may be arranged in various forms according to the design of the aerosol-generating device 100.

FIG. 12 is a diagram illustrating another example of an arrangement of electrodes according to an embodiment.

Referring to FIG. 12, an accommodation portion 1210 is located between the first electrode 1220 and the second electrode 1230. Comparing to the example shown in FIG. 5, in FIG. 12, there is a difference in that a single accommodating portion 1210 is included in a portion 1200 of the aerosol-generating device 100.

However, the number of accommodating portions is not limited to the example shown in FIG. 12 (i.e., one) and the example shown in FIG. 5 (i.e., two), and various numbers of accommodating portions may be included according to the design of the aerosol-generating device 100.

FIG. 13 is a flowchart illustrating an example of a method by which a processor controls an aerosol-generating device according to an embodiment.

Referring to FIG. 13, a method of controlling an aerosol-generating device is provided as described above with reference to FIGS. 1 to 12. Accordingly, even though detailed descriptions are omitted below, it may be seen from the above descriptions that the method of controlling the aerosol-generating device performed by the processor 120 may be applied to FIG. 13.

In step 1310, the processor 120 selects one of a plurality of modes. Here, examples of the plurality of modes have been described above with reference to FIGS. 5 to 10, and detailed descriptions will be omitted below.

In step 1320, the processor 120 adaptively sets the polarity of at least one of the first electrode and the second electrode included in the aerosol-generating device in response to the selected mode. Specifically, the processor 120 may adaptively change the polarities of the first electrode and the second electrode to perform the selected mode.

In step 1330, the processor 120 controls at least one module included in the aerosol-generating device based on a result measured using the first electrode and the second electrode. For example, the processor 120 may control the operation of the heater based on the measurement result. If, in the aerosol-generating device, a first heater for heating a first aerosol-generating material and a second heater for heating a second aerosol-generating material are separated, the processor 120 may control the first heater and the second heater in the same manner or in a different manner. Alternatively, the processor 120 may control the first heater and the second heater at the same time or at different times.

It may be understood by those of ordinary skill in the art that the processor 120 may control not only the heater but also other modules (e.g., batteries, light sources, displays, sensors, etc.) included in the aerosol-generating device.

According to the one or more embodiments above, since the polarities of the electrodes of the aerosol-generating device 100 are adaptively set according to the selected mode, the aerosol-generating device is able to sense or detect in various directions regardless of locations where the electrodes are located, and the accuracy of the detection result is improved.

In addition, the aerosol-generating device 100 controls the operation of the internal modules based on the above-described detection or detection result, so that malfunction or failure of the aerosol-generating device may be prevented.

On the other hand, the above-described method may be written in a program that may be executed on a computer, and may be implemented in a computer that executes the program by using a computer-readable recording medium. In addition, the data structure used in the above-described method may be recorded on a computer-readable recording medium through various means. The computer-readable recording medium includes a storage medium such as a magnetic storage medium (e.g., ROM, RAM, USB, floppy disk, hard disk, etc.) and an optical reading medium (e.g., CD-ROM, DVD, etc.). Here, the computer-readable recording medium may be non-volatile or non-transitory.

At least one of the components, elements, modules or units (collectively "components" in this paragraph) represented by a block in the drawings, such as the controller 120 in FIG. 1, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

One of ordinary skill in the art related to the present embodiments may understand that various changes in form and details can be made therein without departing from the scope of the disclosure. The one or more embodiments of the disclosure should be considered in a descriptive sense and not for the purpose of limiting the scope of the disclosure. The scope of the disclosure is defined by the appended claims, and any modifications, substitutions, improvements or equivalents thereof should be construed as being included in the present disclosure.

The invention claimed is:

1. An aerosol-generating device comprising:
a first electrode located adjacent to a first accommodating portion that is configured to receive a first aerosol-generating material that is a solid at room temperature;
a second electrode located adjacent to a second accommodating portion that is configured to receive a second aerosol-generating material that is a liquid at room temperature; and
a processor configured to adaptively set a polarity of at least one of the first electrode and the second electrode in response to a mode selected from among a plurality of modes,
wherein a dielectric material is located between the first electrode and the second electrode, the dielectric material operating as a capacitor with the first electrode and the second electrode, and the first electrode and the second electrode are located facing each other in an internal space between the first accommodating portion and the second accommodating portion in a longitudinal direction of respective accommodating portions.

2. The aerosol-generating device of claim 1, wherein the processor is configured to set the polarity of the at least one of the first electrode and the second electrode to positive based on the selected mode.

3. The aerosol-generating device of claim 1, wherein the selected mode includes a first mode of detecting a remaining amount of at least one of the first aerosol-generating material and the second aerosol-generating material.

4. The aerosol-generating device of claim 1, wherein the selected mode includes a second mode for detecting an insertion of at least one of the first aerosol-generating material and the second aerosol-generating material.

5. The aerosol-generating device of claim 1, wherein the selected mode includes a third mode for identifying at least one type of the first aerosol-generating material and the second aerosol-generating material.

6. The aerosol-generating device of claim 1, wherein the selected mode includes a fourth mode for sensing the dielectric material located between the first electrode and the second electrode.

7. The aerosol-generating device of claim 1, wherein the selected mode includes a fifth mode for detecting noise of a signal from the at least one of the first electrode and the second electrode.

8. The aerosol-generating device of claim 1, wherein the processor is further configured to change a magnitude of a driving current or a magnitude of a driving voltage applied to the at least one of the first electrode and the second electrode.

9. The aerosol-generating device of claim 1, wherein the first accommodating portion is configured to receive a cigarette including the first aerosol-generating material, and the second accommodating portion is configured to receive a vaporizer including the second aerosol-generating material.

10. The aerosol-generating device of claim 1, wherein the first electrode and the second electrode include an electrode for measuring capacitance.

11. The aerosol-generating device of claim 1, further comprising:
a first heater configured to heat the first aerosol-generating material; and
a second heater configured to heat the second aerosol-generating material,
wherein the processor is further configured to control the first heater and the second heater based on the selected mode.

* * * * *